United States Patent [19]
Ohwaki et al.

[11] Patent Number: 5,801,771
[45] Date of Patent: Sep. 1, 1998

[54] KEYBOARD AND VIDEO CAMERA CONTROL SYSTEM

[75] Inventors: Hirotsugu Ohwaki; Kiyoshi Yoneda, both of Kanagawa, Japan

[73] Assignee: Sony Corporation, Tokyo, Japan

[21] Appl. No.: 682,161

[22] Filed: Jul. 17, 1996

[30] Foreign Application Priority Data

Jul. 20, 1995 [JP] Japan .................................. 7-205072

[51] Int. Cl.⁶ .............................. H04N 5/232; G09G 5/08
[52] U.S. Cl. ...................... 348/211; 345/161; 345/167; 74/471 XY
[58] Field of Search ............................ 348/211, 212, 348/213, 214, 142, 143, 153, 157, 159; 345/156, 157, 161, 164, 167; 341/20, 21, 22; 74/471 XY

[56] References Cited

U.S. PATENT DOCUMENTS

| | | | |
|---|---|---|---|
| 4,933,670 | 6/1990 | Wislocki | 340/709 |
| 4,952,919 | 8/1990 | Nippoldt | 340/710 |
| 4,992,866 | 2/1991 | Morgan | 348/159 |
| 5,367,316 | 11/1994 | Ikezaki | 345/158 |
| 5,566,087 | 10/1996 | Voigt et al. | 364/505 |
| 5,648,798 | 7/1997 | Hamling | 345/163 |

*Primary Examiner*—Wendy Garber
*Assistant Examiner*—Andrew B. Christensen
*Attorney, Agent, or Firm*—Jay H. Maioli

[57] ABSTRACT

A keyboard has a joyball centrally positioned and operable by the operator with a hand, and a plurality of operation keys operable by the operator with the fingertips and disposed in a substantially semicircular array around the joyball. The keyboard is connected to a video camera for controlling the attitude of the video camera with the joyball and adjusting the optical system of the video camera, all with one hand of the operator.

6 Claims, 14 Drawing Sheets

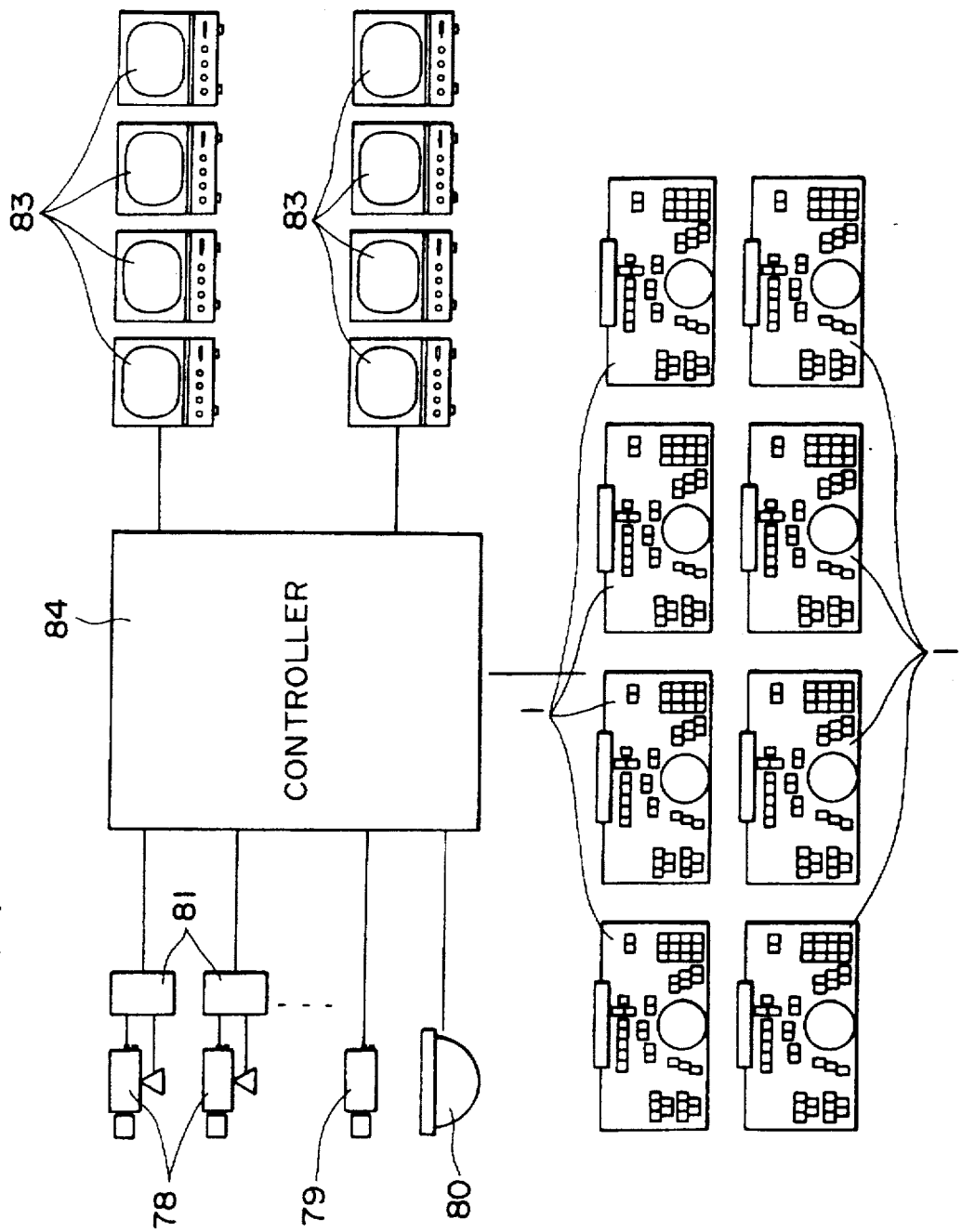

KEYBOARD AND VIDEO CAMERA CONTROL SYSTEM

BACKGROUND OF THE INVENTION

The present invention relates to a keyboard and a video camera system for controlling a video camera used as a monitor video camera, and more particularly to a keyboard and a video camera system with a joyball operable by a single hand and a plurality of easily operable operation keys.

Related art monitor video camera control systems employ a keyboard for remotely controlling the attitude of the monitor video cameras and adjustments of optical systems thereof.

Such a keyboard typically has a joystick that can be operated by a single hand for remotely controlling the attitude of a monitor video camera and a number of operation keys for remotely adjusting the optical system of the monitor video camera. The joystick, which is analogous to an aircraft control column, is gripped by the operator with a single hand. When the joystick is tilted in biaxial directions, it controls the attitude of the video camera for panning and tilting movement.

At the time of controlling the video camera for panning and tilting movement, it is also necessary for the operator to control the optical system of the video camera for adjusting the zooming, focusing, and iris of the lens system. The related art joystick cannot be operated unless it is fully gripped by a single hand, e.g., the right hand, of the operator. Therefore, while the operator is gripping the joystick with the right hand, it is impossible for the operator to operate a plurality of operation keys with the same right hand for controlling the optical system to adjust the zooming, focusing, and iris of the lens system.

It has been customary for the operator to use both hands to control the video camera by gripping the joystick with the right hand while operating a plurality of operation keys with fingers of the left hand for controlling the optical system to adjust the zooming, focusing, and iris of the lens system.

Since, however, the operator generally cannot move fingers of the left hand as smoothly as fingers of the right hand, the process of controlling the video camera with both hands is not highly efficient.

SUMMARY OF THE INVENTION

It is therefore an object of the present invention to provide a keyboard which allows the operator to use only a single hand to control the attitude of a video camera and adjust the optical system of the video camera.

To accomplish the above object, there is provided in accordance with the present invention a keyboard comprising a joyball operable by an operator with a hand, and a plurality of operation keys and operable by the operator with fingertips, the joyball being disposed in a central position and the operation keys being disposed in a substantially semicircular array around the joyball.

The operator can tilt the joyball with a single hand, e.g., the right hand, placed on the joyball, and at the same time can operate the operation keys positioned in a substantially semicircular pattern around the joyball with the fingertips of the hand. Therefore, the operator can operate the joyball and the operation keys highly easily and efficiently.

BRIEF DESCRIPTION OF THE DRAWINGS

FIG. 14 is a block diagram of the monitor video camera control system.

DETAILED DESCRIPTION OF THE PREFERRED EMBODIMENT

Figure 1:
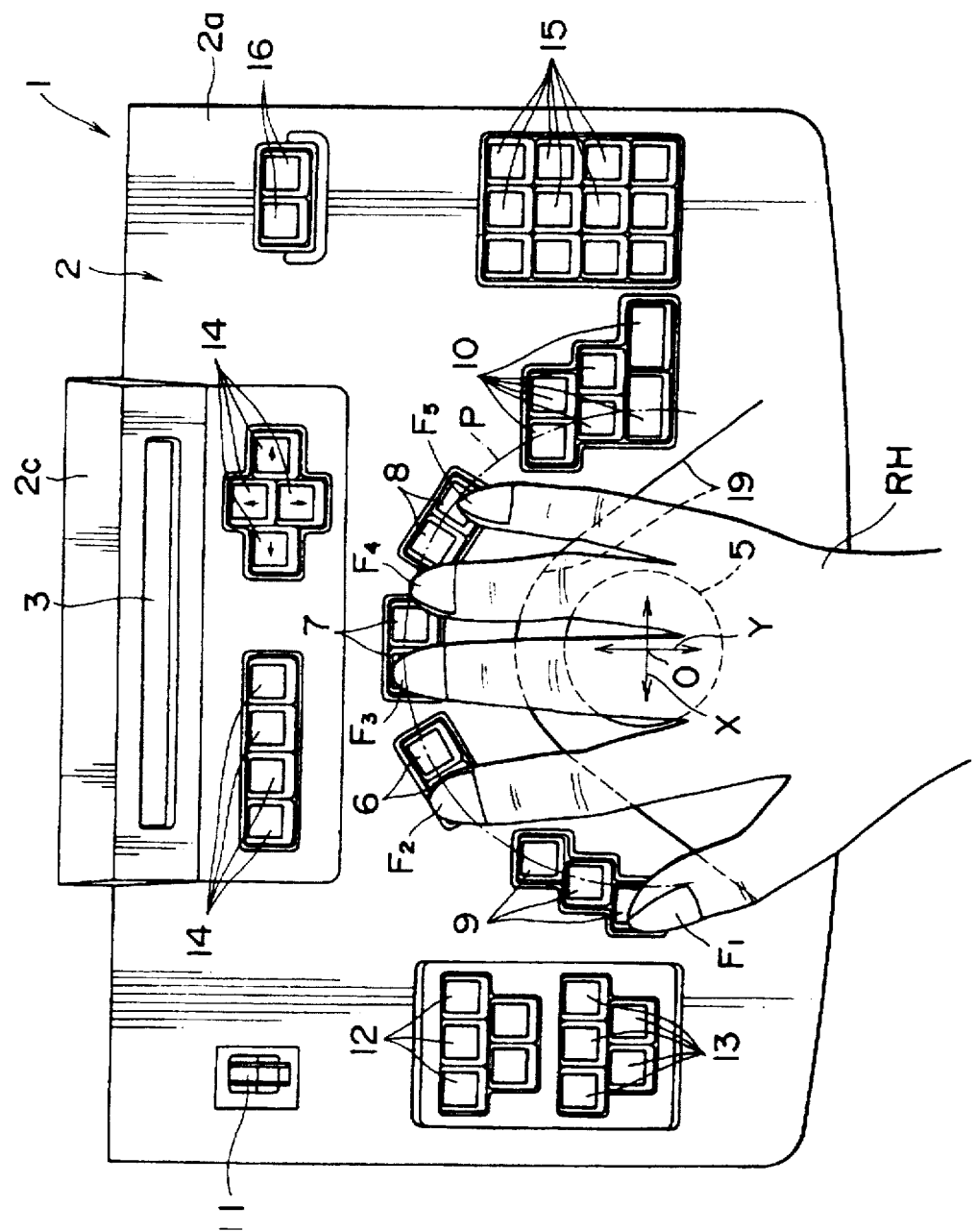
FIG. 1 is a plan view of a keyboard according to the present invention, which is incorporated in a monitor video camera control system, the view also showing how to operate the keyboard with a single hand.
Figure 2:
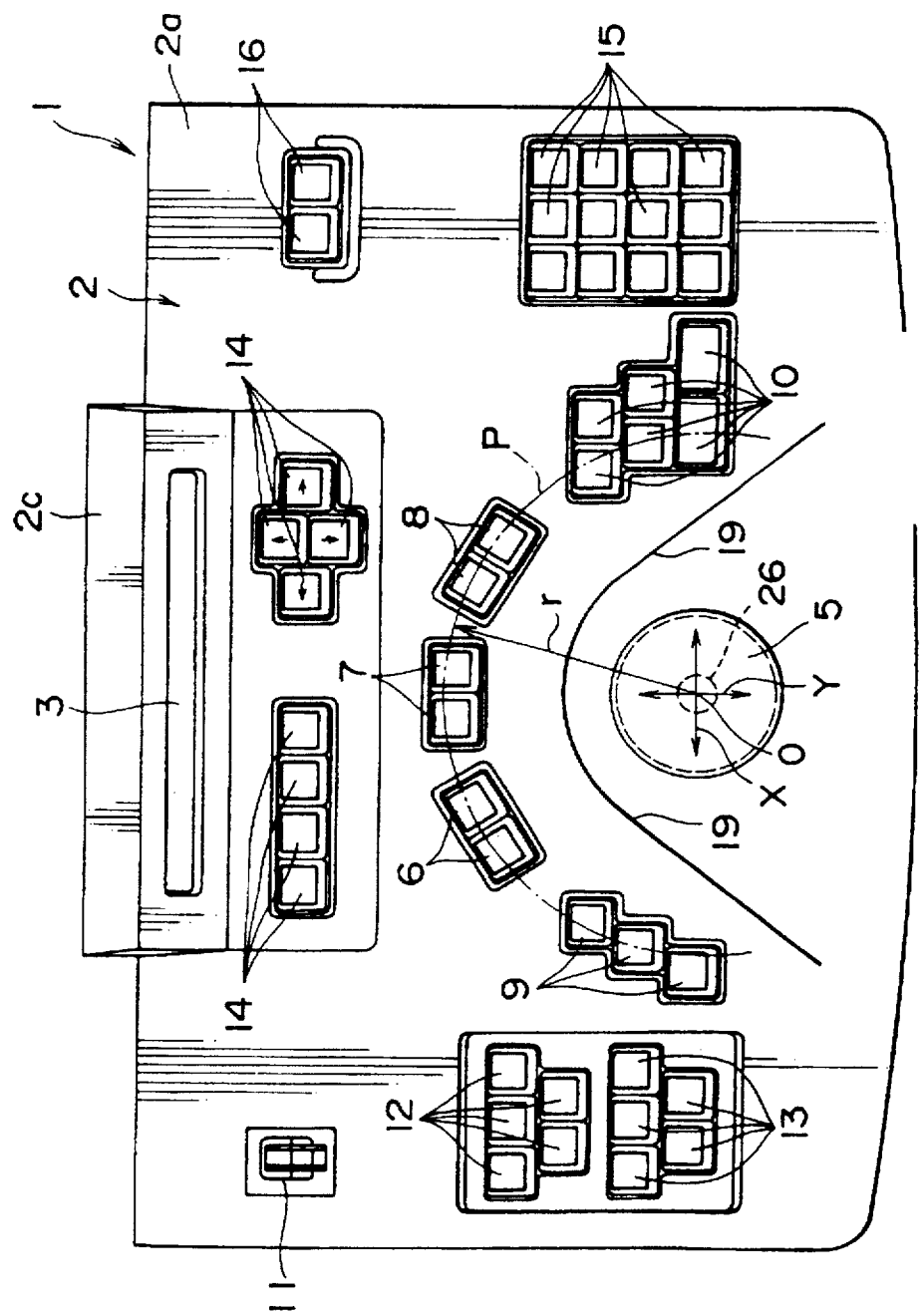
FIG. 2 is a plan view of the keyboard.
Figure 3:
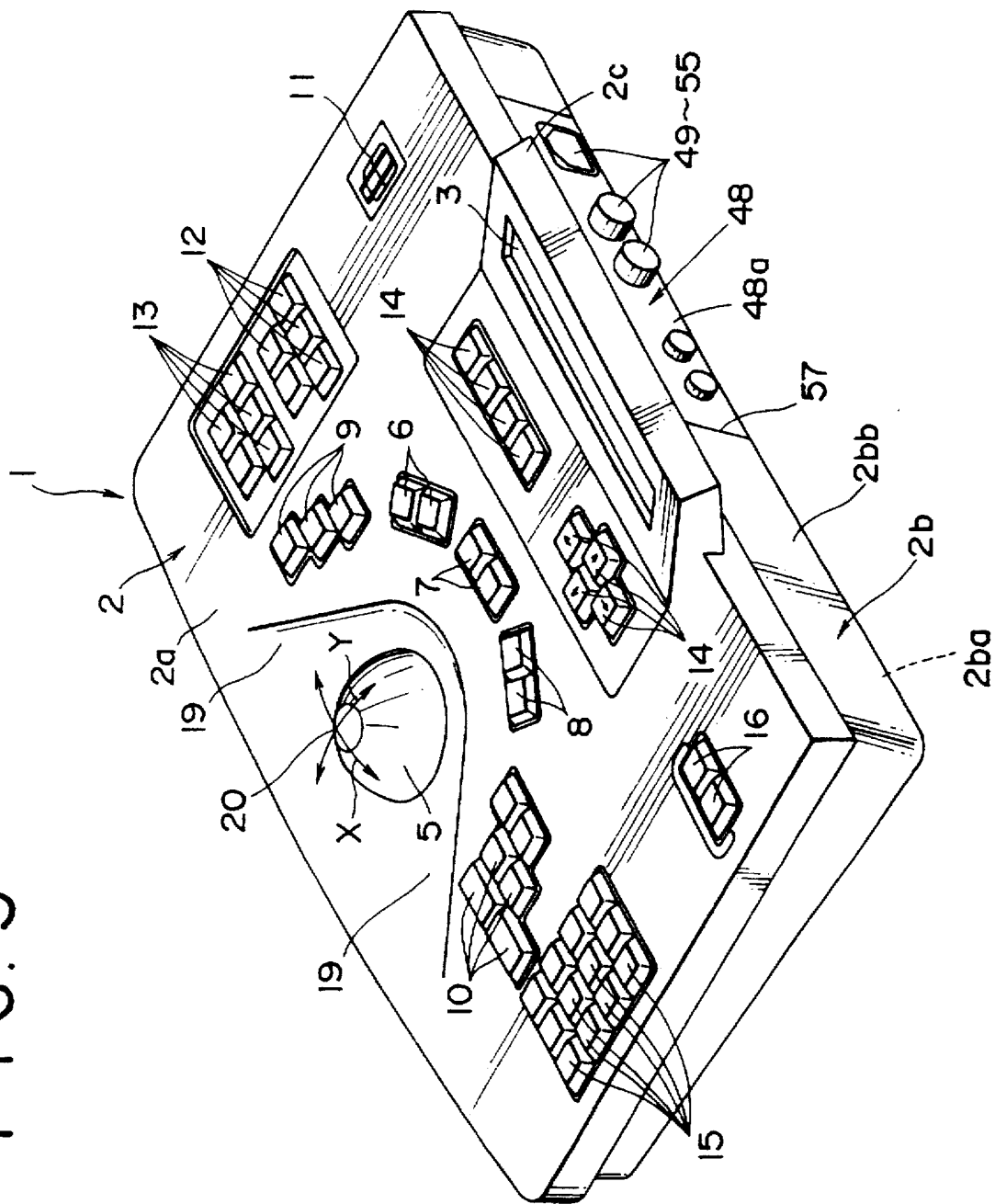
FIG. 3 is a perspective view of the keyboard.

A keyboard according to the present invention, which is incorporated in a video camera control system, will be described below with reference to FIGS. 1 through 7.

The keyboard, generally designated by the reference numeral 1, has a flat box-shaped keyboard casing 2 including an upper panel 2a slanted upwardly rearwardly (upwardly to the right in FIG. 4) with respect to a lower panel 2b. The keyboard 1 has a display mount 2c integral with the upper panel 2a and slanted further upwardly with respect to the upper panel 2a, the display mount 2c being positioned centrally on a rear edge (right-hand edge shown in FIG. 4) of the upper panel 2a. A liquid crystal display panel 3 is mounted on the display mount 2c.

A joyball 5 for controlling the attitude of a video camera (described later on) for panning and tilting movement is disposed on the upper panel 2a. The joyball 5 is composed of a substantially hemispherical member made of an elastic material having a high coefficient of friction, such as rubber or the like. The joyball 5 can be tilted in a certain angular range in biaxial directions, i.e., X-axis directions shown as horizontal directions and Y-axis directions shown as vertical directions in FIGS. 1 and 2. When the joyball 5 is tilted in the X-axis directions, the video camera is panned, and when the joyball 5 is tilted in the Y-axis directions, the video camera is tilted.

The upper panel 2a supports thereon a plurality of operation keys for controlling or adjusting the optical system of the video camera, including two zoom keys 6 for zooming the lens system of the optical system, two focus keys 7 for focusing the lens system, and two iris keys 8 for adjusting the iris of the lens system.

The upper panel 2a also supports thereon three pan-tilter keys 9 for turning on and off an automatic mode to control the video camera for panning and tilting movement, bringing the video camera into a predetermined position, and automatically returning the video camera to an original position, and six right-side keys 10 for displaying a preset date and a camera title on the liquid crystal display panel 3, confirming an entered program number, a video camera number, and a monitor television number, resuming an interrupted program, and calling a video camera.

The upper panel 2a further supports thereon a power key 11, five housing keys 12 for turning on and off a video camera power supply, a wiper power supply, a defroster power supply, and external device power supplies, five function keys 13 for effecting printout operation on a video printer and transmitting individual and simultaneous broadcasting signals to video cameras, eight menu keys 14 including cursor keys for selecting various pieces of information displayed on the liquid crystal display panel 3, numeric keys (ten-key pad) 15 for establishing a video camera number, a monitor number, a camera title, a date, etc., and two alarm keys 16 for energizing and resetting a buzzer.

All the operation keys 6~16 are mounted on respective pushbutton switches 17 which are in turn mounted on a switch board 18 housed in the keyboard casing 2 directly below the upper panel 2a.

The numeric keys 15 are positioned on a right-hand end portion (right-hand end shown in FIG. 2) of the upper panel 2a so that they can easily be operated by fingers of the right hand of the operator. The joyball 5, the zoom keys 6, the focus keys 7, the iris keys 8, the pan-tilter keys 9, and the right-side keys 10, which will be used very frequently, are positioned in a substantially central area of the upper panel 2 with respect to the transverse (vertical in FIG. 2) and horizontal (horizontal in FIG. 2) directions of the keyboard 1.

The joyball 5 is positioned centrally on the upper panel 2a with respect to the transverse and horizontal directions of the keyboard 1, near a front edge (lower edge in FIG. 2) of the upper panel 2a. The pan-tilter keys 9, the zoom keys 6, the focus keys 7, the iris keys 8, and the right-side keys 10 are positioned in a semicircular pattern around the joyball 5 from a position leftward of the joyball 5 through a position rearward of the joyball 5 to a position rightward of the joyball 5 successively in the order named.

The upper panel 2 has a recess 19 defined by a smoothly curved surface around the joyball 5.

The joyball 5 has a flat horizontal surface 20 on its upper end which lies perpendicularly to the axis $P_1$ (see FIG. 8) thereof.

A radius "r" (see FIG. 7) from the center O of the joyball 5 to a semicircular line P along which the operation keys 6~10 are arrayed is set to a value ranging from about 80 to 100 mm, preferably a value of 91.5 mm.

A height H from the lowermost surface of the recess 19 in the upper panel 2a to the flat surface 20 on the upper end of the joyball 5 is set to a value ranging from about 27.0 to 29.0 mm, preferably a value of 28.0 mm.

The joyball 5 and the operation keys 6~10 which will be used very frequently can be operated by the operator with a single hand, e.g., a right hand.

Figure 7:
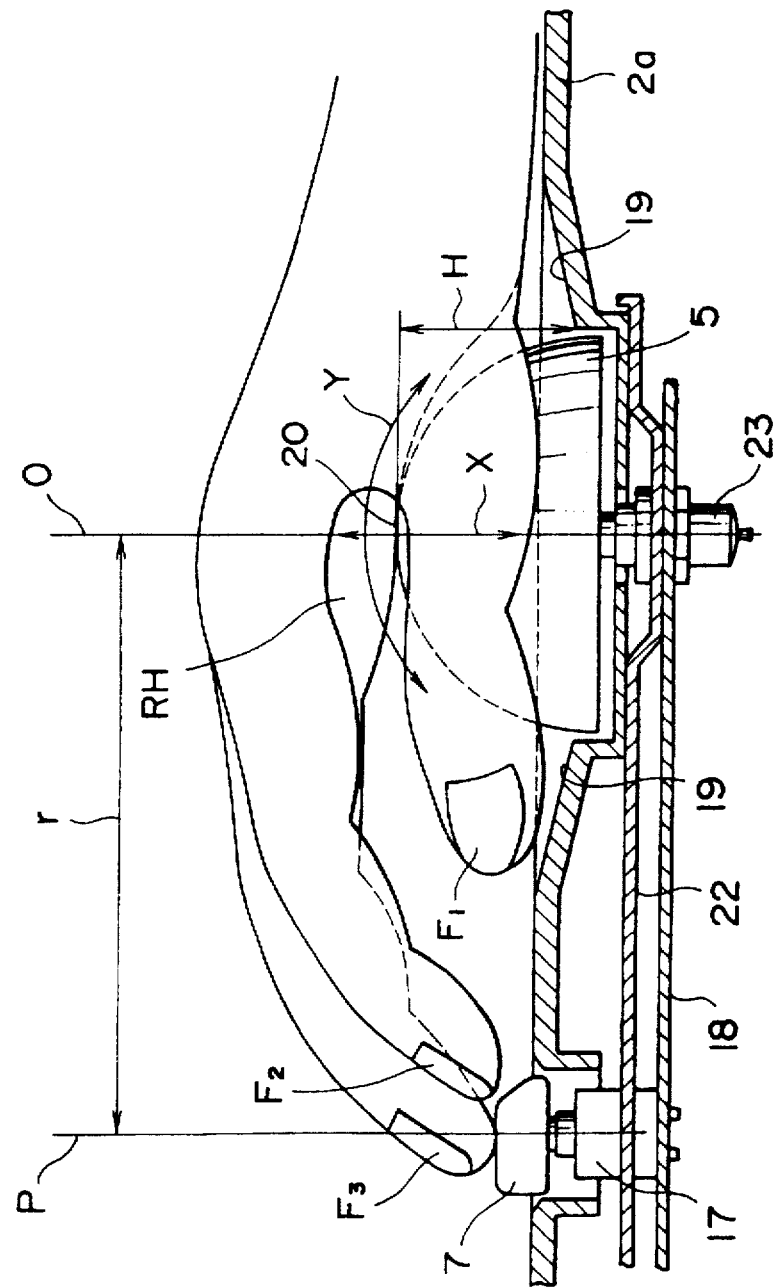
FIG. 7 is a side elevational view, partly in vertical cross section, showing how a joyball and operation keys on the keyboard are operated by a single hand.

Specifically, as shown in FIGS. 1 and 7, the operator places the right hand RH over the joyball 5 in a manner to hold the joyball 5 with the palm. With the right hand RH thus positioned, the operator can bring five fingertips $F_1$~$F_5$ easily in touch with the five categories of the pan-tilter keys 9, the zoom keys 6, the focus keys 7, the iris keys 8, and the right-side keys 10 without undue stress.

Therefore, the operator can tilt the joyball 5 with the right hand RH in the X- and Y-axis directions while at the same time easily operating the five types of the operation keys 6~10 with the five fingertips $F_1$~$F_5$.

The operator can tilt the joyball 5 in the X- and Y-axis directions to control the attitude of the video camera for panning and tilting movement, and also can operate the zoom keys 6, the focus keys 7, and the iris keys 8, all of which are operation keys for adjusting the optical system, that is, to adjust the zooming, focusing, and iris of the lens system, and also the pan-tilter keys 9 and the right-side keys 10, all easily with the right hand.

Since the joyball 5 is composed of a substantially hemispherical member made of an elastic material having a high coefficient of friction, such as rubber or the like and has the flat surface 20 on its upper end, the operator has a good tactile feeling when placing and cupping the hand RH on the joyball 5, and the hand RH therefore is not slippery with respect to the joyball 5. Consequently, the operator can tilt the joyball 5 with the hand RH with a good response in the X- and Y-axis directions.

The flat surface 20 on the upper end of the joyball 5 allows the operator to tilt the joyball 5 with a single finger in the X- and Y-axis directions. The flat surface 20 prevents the hand cupped on the joyball 5 from slipping on the joyball 5.

When the operator tilts the joyball 5 in the X- and Y-axis directions with the hand RH placed and cupped on the joyball 5, the presence of the recess 19 defined in the upper panel 2a around the joyball 5 minimizes the possibility of the hand RH interfering with the upper panel 2a and hence undue limitations on the angle by which the joyball 5 can be tilted. Accordingly, the operator can tilt the joyball 5 smoothly in a predetermined angular range.

A support structure for the joyball 5 will be described below with reference to FIG. 8.

A cylindrical stick holder 23 is vertically fixed by a lock nut 24 or the like to a switch attachment plate 22 disposed in the keyboard casing 2 and lying parallel to the lower surface of the upper panel 2a. The stick holder 23 extends through a through hole 25 defined centrally in the recess 19 in the upper panel 2a and is erected vertically upwardly above the upper panel 2a.

A joystick 26 is inserted vertically coaxially in the stick holder 23. The joystick 26 is supported so as to be angularly movable in a certain angle in the X- and Y-axis directions about a pivot 27 which supports an axially (vertically) intermediate portion of the joystick 26 in the stick holder 23. The stick holder 23 houses in its lower end a strain gage 28 positioned closely to a lower end 26b of the joystick 26. The strain gage 28 consists of a piezoelectric element or the like which serves as a sensor for detecting the direction, i.e., the X- or Y-axis direction, in which and the angle through which the joystick 26 is tilted.

The joyball 5 is removably mounted on and around an upper end portion 26a of the joystick 26.

The hemispherical joyball 5 made of rubber or the like has a flat horizontal lower surface in which three or four cylindrical nuts 30 are vertically insert-molded at equally spaced intervals. A disk-shaped frame 31 molded of synthetic resin is horizontally fastened to the lower surface of the joyball 5 by three or four setscrews 32 that are threaded in the respective nuts 30. The joyball 5 has lower and upper cylindrical cavities 33a, 33b defined coaxially centrally in the lower surface thereof, and the frame 31 has integral lower and upper cylindrical bosses 31a, 31b formed coaxially centrally thereon which are fitted respectively in the lower and upper cylindrical cavities 33a, 33b. A plurality of elastic locking fingers 34 are formed integrally with and extend downwardly from a lower end of the upper cylindrical boss 31b. These locking fingers 34 project inwardly in a confronting relation. The frame 31 has three or four stopper attachments 35 integrally formed with a lower surfaced thereof at equally spaced intervals, and ring-shaped stoppers 36 of an elastic material such as rubber are fitted over and secured to the stopper attachments 35 by adhesive bonding or the like.

A cylindrical joint spacer 37 of metal, which has been brought downwardly, is placed around an upper end portion of the stick holder 23 with a clearance left therebetween. The joint spacer 37 has a central hole 38 defined in its upper end which receives the upper end portion 26a of the joy stick 26. The joint spacer 37 is fixed to the upper end potion 26a of the joy stick 26 by a radial setscrew 39.

The upper cylindrical boss 31b of the frame 31 fastened to the joy ball 5 is detachably mounted on an upper end portion of the joint spacer 37, and is circumferentially rotatable around, but snugly fitted over, the upper end portion of the joint spacer 37. The locking fingers 34 of the upper cylindrical boss 31b elastically engage in an annular locking slot 40 defined in the outer circumferential surface of a lower end portion of the joint spacer 37. The locking fingers 34 thus locked in the annular locking slot 40 prevent the joy ball 5 from being pulled upwardly from the joy spacer 37.

With the joy ball 5 thus secured to the upper end portion 26a of the joy stick 26, the stoppers 36 on the stopper attachments 35 of the frame 31 are loosely fitted in respective stopper limit holes 41 which are defined in the upper panel 2a.

When the joy ball 5 is tilted in the X- and Y-axis directions by the operator with the hand RH, the joy stick 26 in the stick holder 23 is also tilted together with the joy ball 5 in the X- and Y-axis directions about the pivot 27. The direction in, and the angle through, which the joy stick 26 and hence the joy ball 5 are tilted are detected by the strain gage 28, which outputs a detected signal representative of the detected direction and angle.

When the joy stick 26 is tilted to a maximum angle in the X- and Y-axis directions, one of the stoppers 26 elastically abuts against an inner wall surface of the corresponding stopper limit hole 41, thereby preventing the joy stick 26 from being tilted further beyond the maximum angle.

When the joy ball 5 is rotated about an axis $P_1$ of the joy stick 26, the locking fingers 34 slide in the annular locking slot 40. Therefore, the joy ball 5 slips circumferentially around the joint spacer 37, and the torque of the joy ball 5 is not transmitted to the joy stick 26. The joy stick 26 is thus prevented from rotating with the joy ball 5 and hence from being unduly damaged. While the joy ball 5 is rotatable about the axis $P_1$, it is prevented from being rotated beyond an angular range that is equivalent to the interval of play which the stoppers 36 have in the respective stopper limit holes 41.

Figure 8:
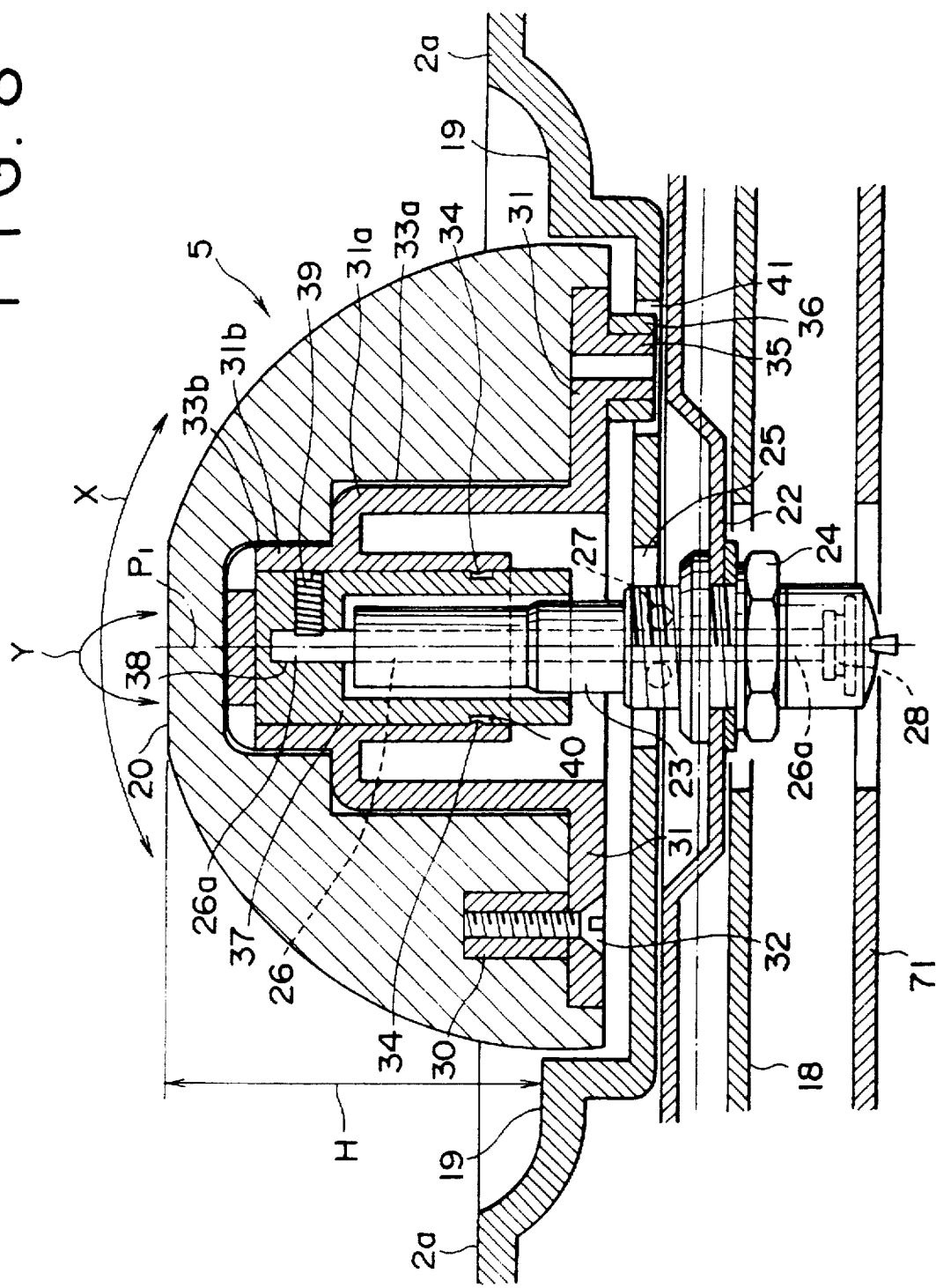
FIG. 8 is an enlarged vertical cross-sectional view of a support structure for the joyball.

When the joy ball 5 is forcibly pulled upwardly in FIG. 8, the locking fingers 34 are elastically forced out of the annular locking slot 40. Therefore, the joy ball 5 can easily be removed from the joint spacer 37. Conversely, the joy ball 5 can easily be placed downwardly over the joint spacer 37 until the locking fingers 34 elastically snap into the annular locking slot 40. As a consequence, the joy ball 5 can easily be installed on and removed from the joy stick 26.

Two modes of use in which the keyboard 1 can be installed on a control desk 43 will be described below with reference to FIGS. 4 through 6.

Figure 4:
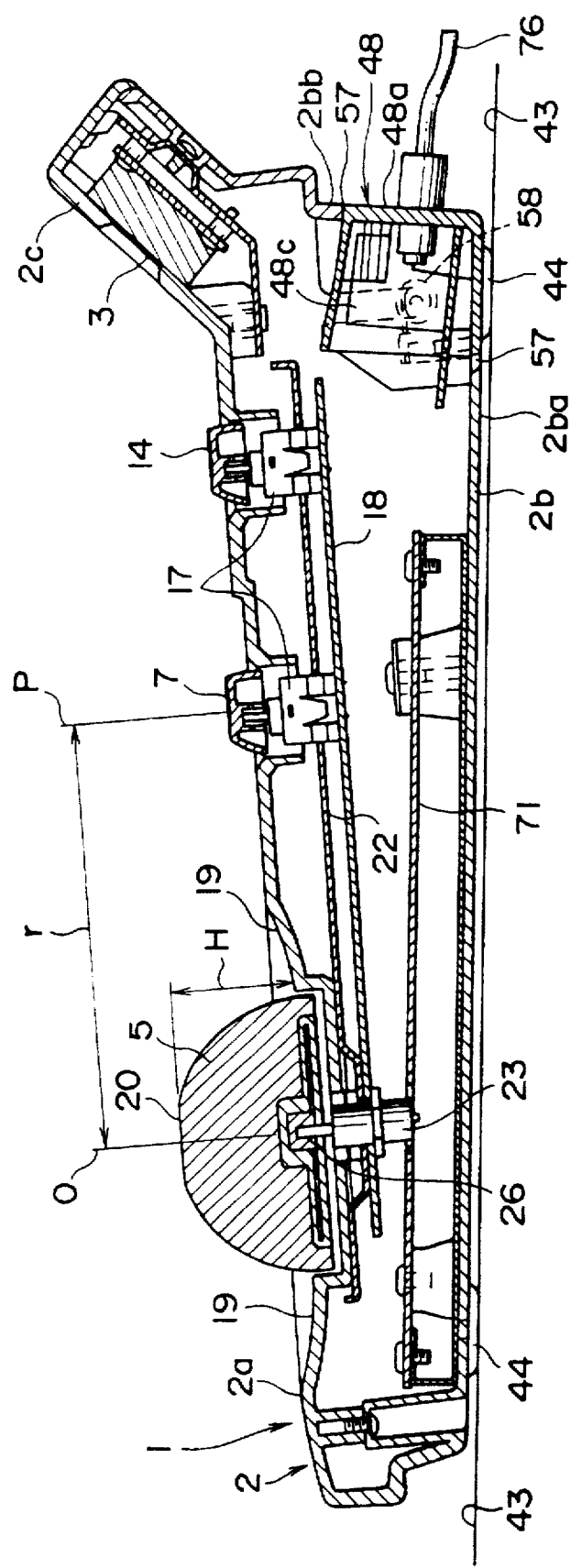
FIG. 4 is a vertical cross-sectional view of the keyboard, showing the manner in which the keyboard is placed on the upper surface of a control desk for use.

According to the first mode of use, as shown in FIG. 4, the keyboard 1 is placed on the control desk 43 by four feet 44 of rubber or the like which are attached to the respective four corners of a lower surface 2ba of the lower panel 2b of the keyboard casing 2.

Figure 5:
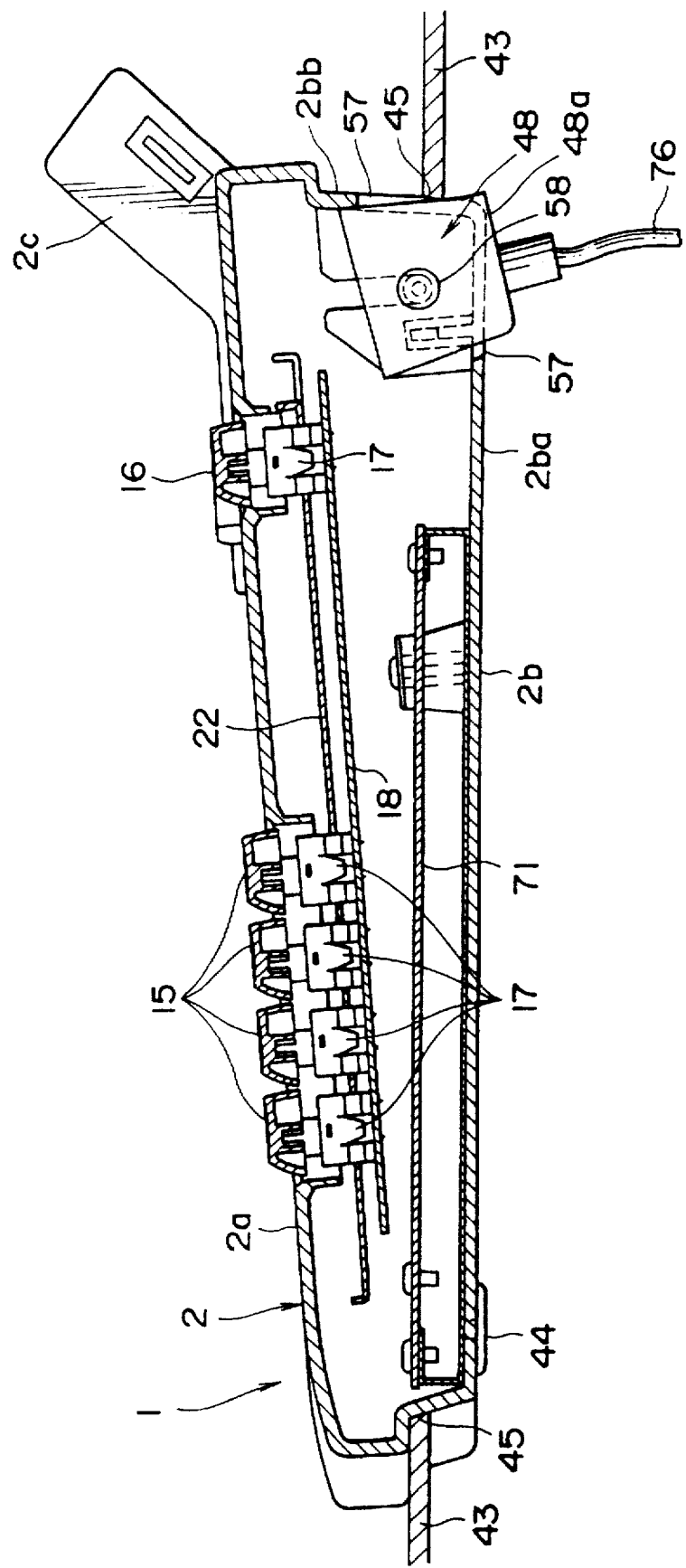
FIG. 5 is a vertical cross-sectional view of the keyboard, showing the manner in which the keyboard is placed in a keyboard attachment recess defined in a control desk for use.
Figure 6:
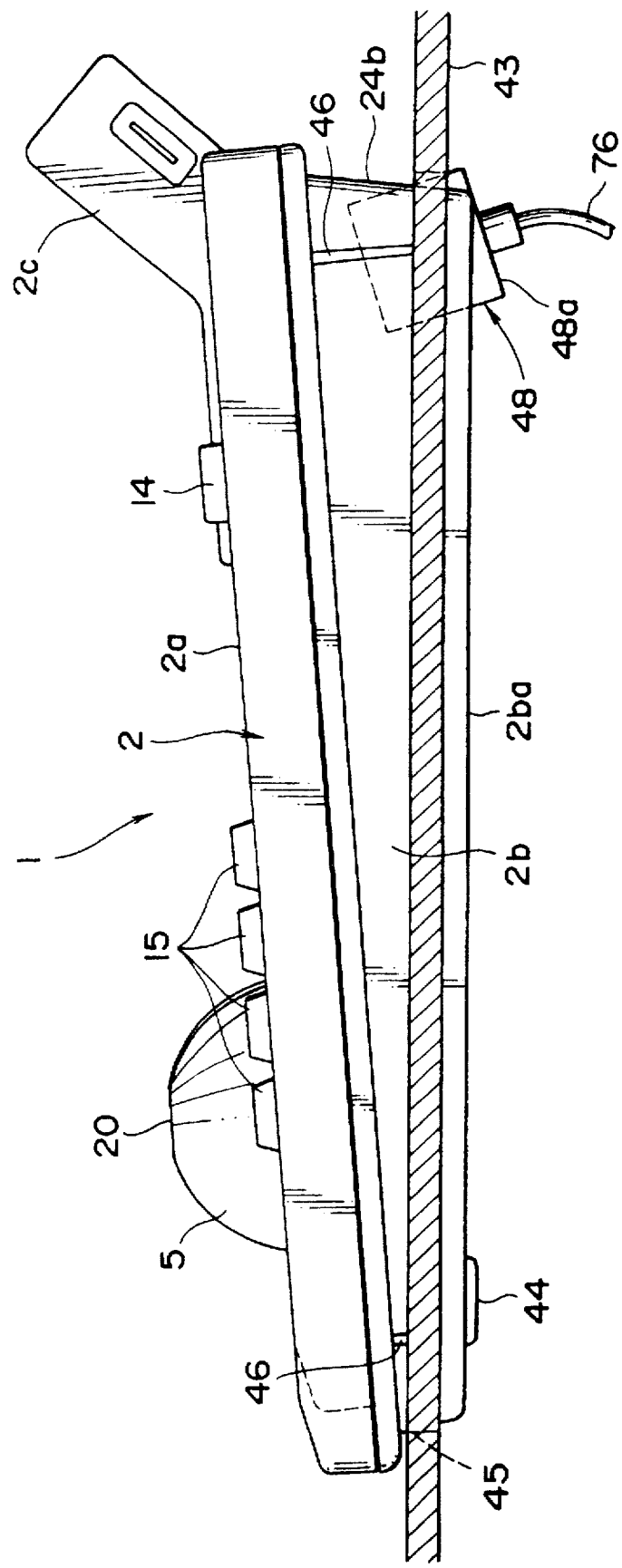
FIG. 6 is a side elevational view of the keyboard shown in FIG. 5.

According to the second mode of use, as shown in FIGS. 5 and 6, the lower panel 2b of the keyboard casing 2 is inserted downwardly in a keyboard attachment recess 45 defined in a control desk 43, so that the keyboard 1 will be used in a partly inserted position in the control desk 43. The keyboard casing 2 has a plurality of positioning ribs 46 integrally formed with its outer peripheral wall which engage an upper surface of the control desk 43 around the keyboard attachment recess 45 for thereby limiting the distance by which the keyboard 1 is inserted in the keyboard attachment recess 45.

A multiple-terminal rotary connector 48 attached as an external interface to a rear lower portion of the keyboard 2 will be described below with reference to FIGS. 4 through 6 and 9 through 13.

Figure 12:
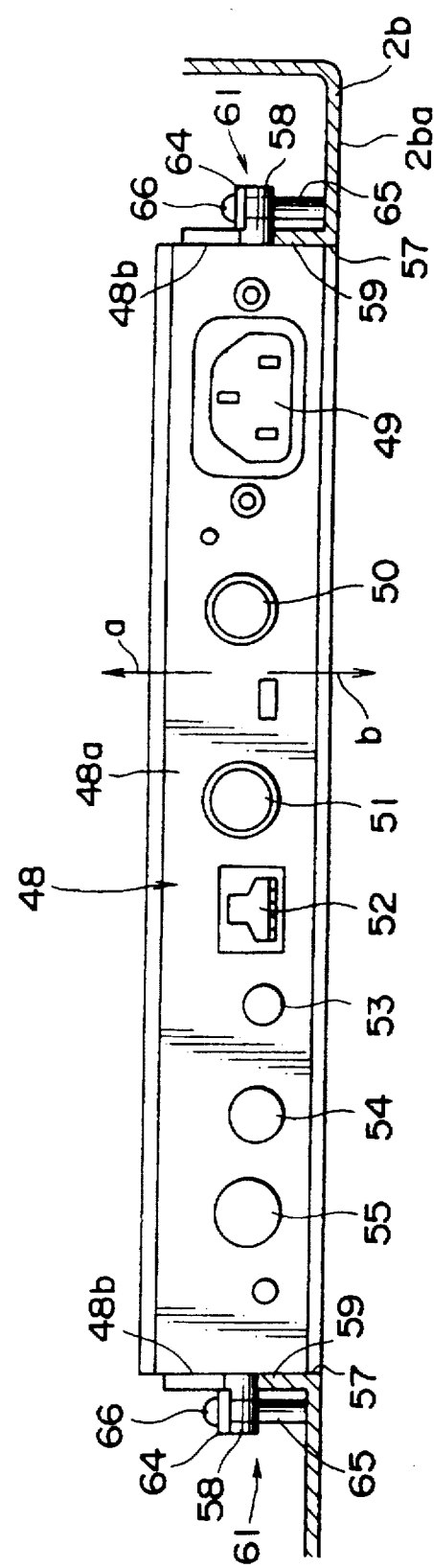
FIG. 12 is a rear elevational view, partly in vertical cross section, of the pivotal structure and the positioning mechanisms for the rotary connector.

The rotary connector 48 is composed of a casing molded of synthetic resin or the like in the form of a horizontally elongate, substantially rectangular, parallelepiped. The rotary connector 48 has a horizontally elongate terminal attachment surface 48a on which a plurality of terminals projecting perpendicularly therefrom are mounted in a horizontal array for inputting and outputting external signals. As shown in FIG. 12, the terminals include a power supply inlet terminal (AC IN) 49, video signal input and output terminals (VIDEO IN, OUT) 50, 51, a keyboard interface terminal (KBD I/F) 52, a printer terminal 53, a microphone terminal 54, and an audio signal output terminal (AUDIO OUT) 55.

The rotary connector 48 is horizontally placed in an opening 57 defined in a corner composed of the lower surface 2ba of the lower panel 2b and a rear surface 2bb extending upwardly from the lower panel 2b.

The rotary connector 48 has a pair of horizontally coaxial pivot shafts 58 (see FIG. 12) integrally formed with respective opposite side surfaces thereof. The keyboard casing 2 has a pair of parallel vertical connector support plates 59 positioned one on each side of the opening 57 and having respective U-shaped grooves 60 defined vertically in central areas thereof. The pivot shafts 58 of the rotary connector 48 are inserted respectively in the U-shaped grooves 60. The rotary connector 48 is supported by the pivot shafts 58 received in the respective U-shaped grooves 60 for angular movement through an angle θ of about 75° (see FIG. 11A), for example, in the vertical directions indicated by the arrows "a", "b".

Figure 13:
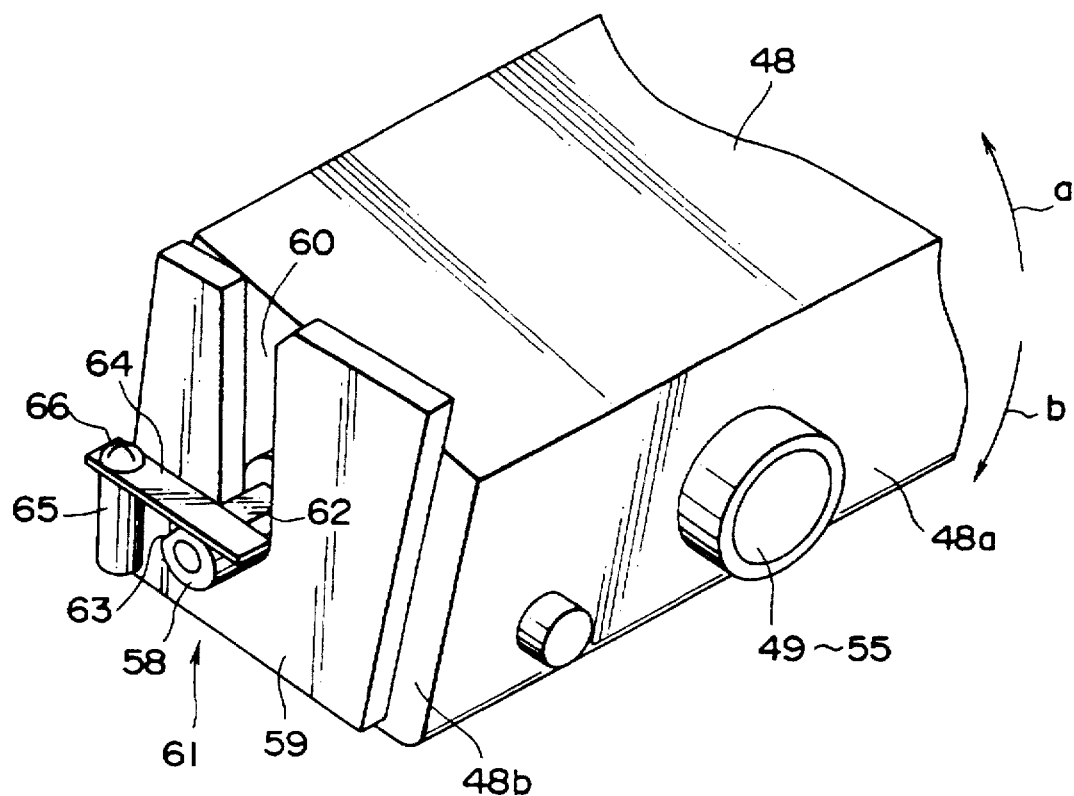
FIG. 13 is a perspective view of the pivotal structure and the positioning mechanisms for the rotary connector.

The rotary connector 48 can be positioned in two angular positions in the vertical directions indicated by the arrows "a", "b" by a pair of positioning mechanisms 61. As shown in FIG. 13, the positioning mechanisms 61 consist of respective pairs of flat surfaces 62, 63 formed on the circumferences of the pivot shafts 58 and angularly spaced from each other by about 75° (see FIG. 11B), and a pair of leaf springs 64 elastically pressed against the flat surfaces 62, 63. The leaf springs 64 are fixed by respective screws 66 to respective screw bosses 65 which are integrally formed with the lower panel 2b one on each side of the opening 57. The leaf springs 64 extend perpendicularly to the respective pivot shafts 58 and are pressed substantially horizontally against the respective pivot shafts 58.

The rotary connector 48 has a pair of stoppers 68a, 68b (see FIGS. 9 and 10) engageable with a pair of respective abutments 67a, 67b on the lower and rear surfaces 2ba, 2bb of the keyboard casing 2 for preventing the rotary connector 48 from being angularly moved beyond the angle θ of about 75° in the vertical directions indicated by the arrows "a", "b".

The rotary connector 48 has a terminal board 69 disposed in an internal space 48c thereof, and the terminals 49–55 are connected to the terminal board 69 by leads 70. The terminal board 69 is electrically connected to a main circuit board 71 fastened to the lower panel 2b by screws in the keyboard casing 2 by an elongate flexible connector 72 such as a flexible printed board or a harness, and a pair of removable couplings 73, 74 at the opposite ends of the connector 72.

Figure 9:
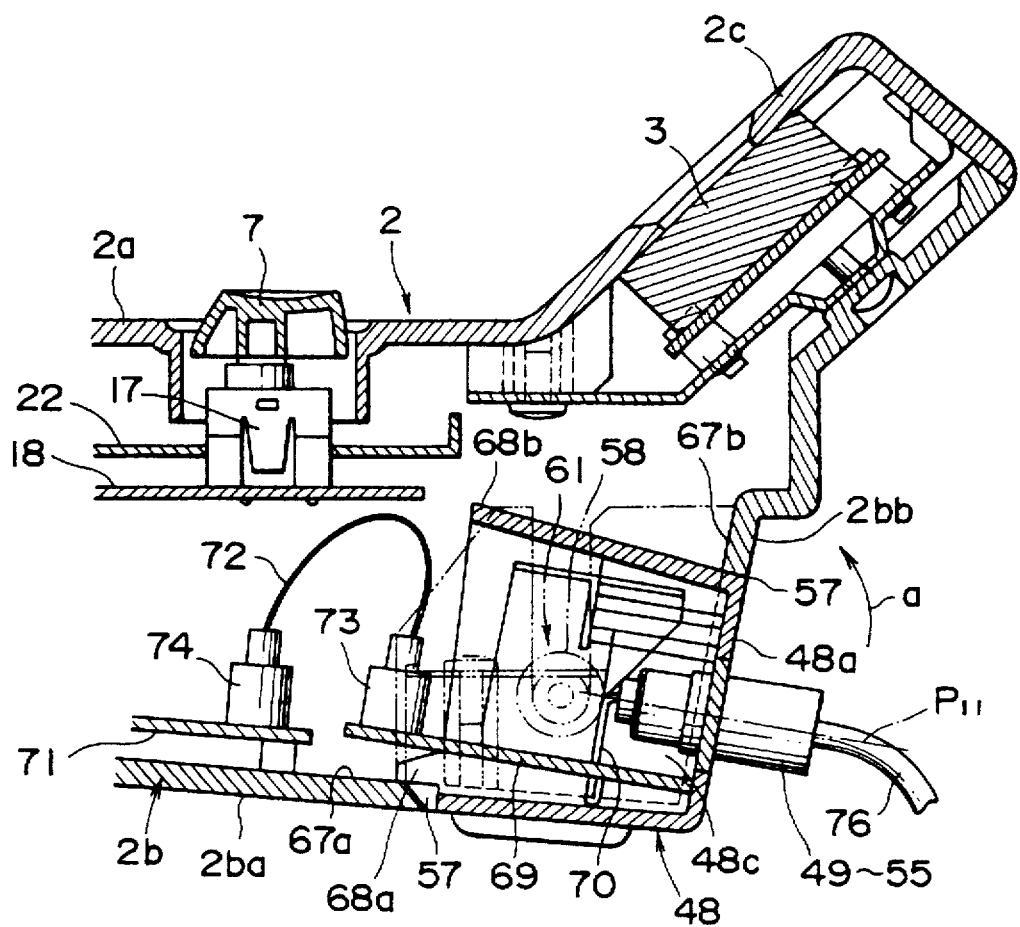
FIG. 9 is an enlarged vertical cross-sectional view of a rotary connector as an external interface which is shown as being in a first substantially horizontal position.

When the rotary connector 48 is angularly moved through the angle θ of about 75° in the upward direction indicated by the arrow "a" about the pivot shafts 58 within the opening 57, as shown in FIG. 9, the leaf springs 64 are lifted off the flat surfaces 63 of the pivot shafts 58 which turn with the rotary connector 48, and thereafter the stopper 68a abuts against and is stopped by the abutment 67a in the direction indicated by the arrow "a". At the same time, the leaf springs 64 are pressed flatwise against the respective flat surfaces 62 of the pivot shafts 58, thus positioning the rotary connector 48 in one of the two angular positions.

As shown in FIG. 9, the terminal attachment surface 48a is directed substantially vertically, and the terminals 49–55 are held in a substantially horizontal first position $P_{11}$ in which they project rearwardly above the lower surface 2ba of the keyboard casing 2.

Figure 10:
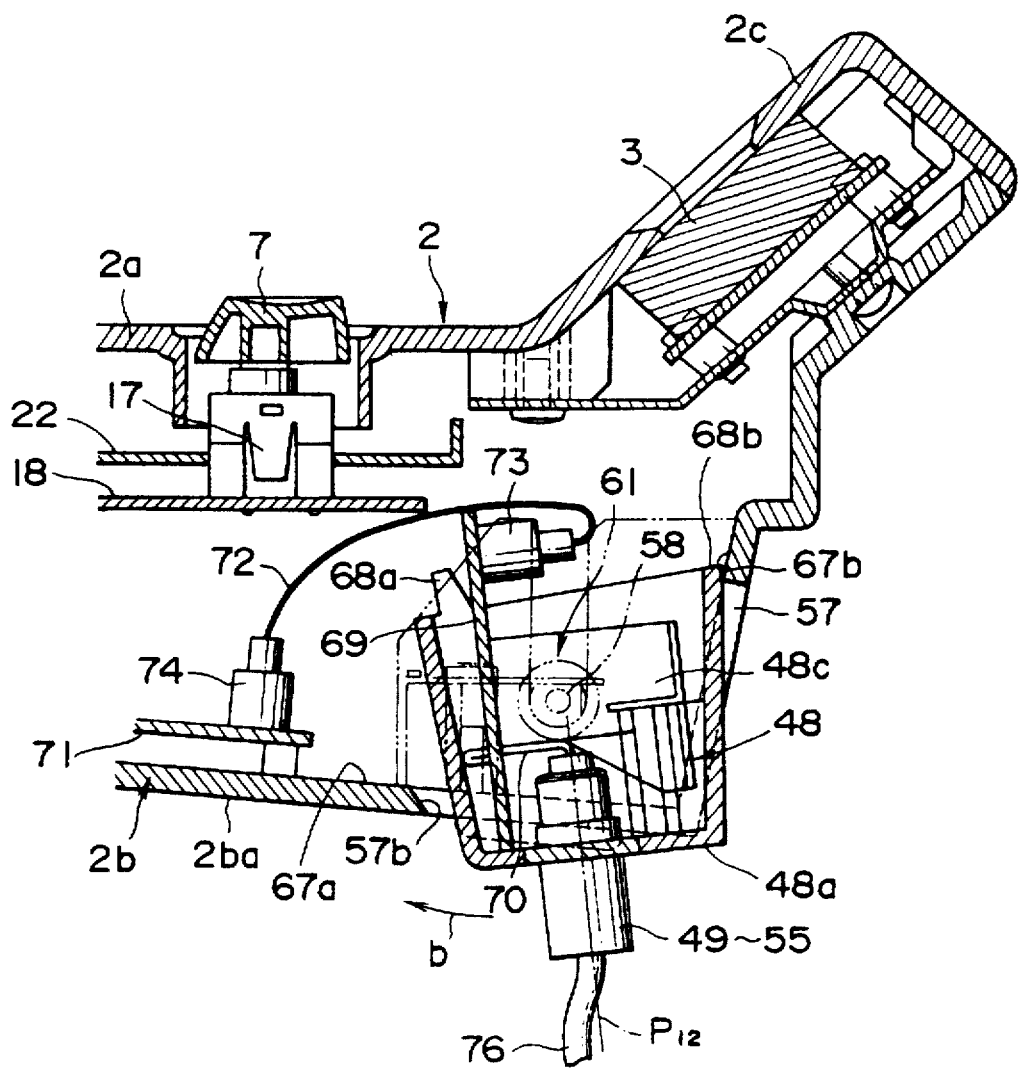
FIG. 10 is an enlarged vertical cross-sectional view of the rotary connector which is shown as being tilted downwardly to a second substantially vertical position.
Figure 11A:
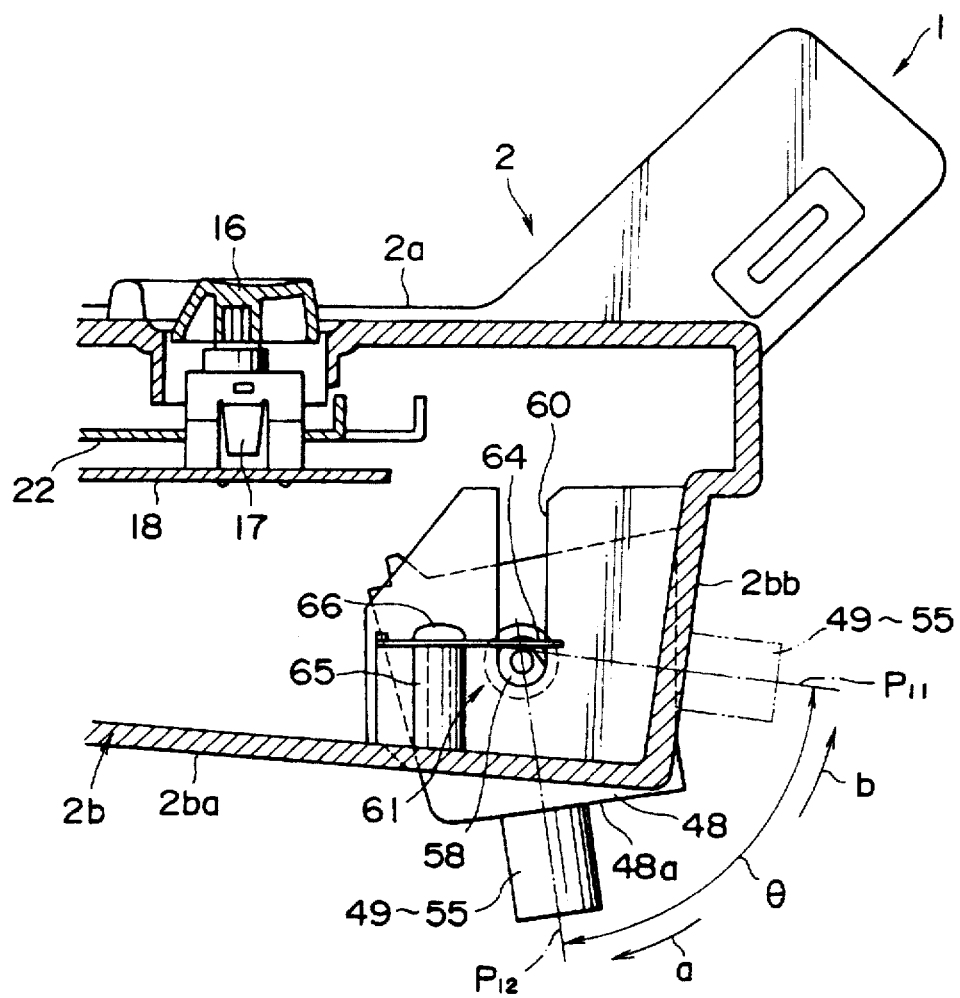
FIG. 11A is a side elevational view, partly in vertical cross section, of a pivotal structure and positioning mechanisms for the rotary connector.
Figure 11B:
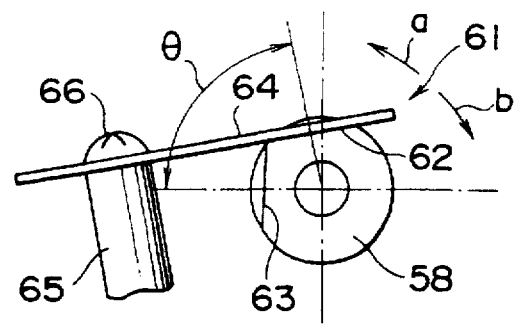
FIG. 11B is an enlarged side elevational view of the pivotal structure and the positioning mechanisms for the rotary connector.

When the rotary connector 48 is angularly moved through the angle θ of about 75° in the downward direction indicated by the arrow "b" about the pivot shafts 58 within the opening 57, as shown in FIG. 10, the leaf springs 64 are lifted off the flat surfaces 62 of the pivot shafts 58 which turn with the rotary connector 48, and thereafter the stopper 68b abuts against and is stopped by the abutment 67b in the direction indicated by the arrow "b". At the same time, the leaf springs 64 are pressed flatwise against the respective flat surfaces 63 of the pivot shafts 58, thus positioning the rotary connector 48 in the other of the two angular positions.

As shown in FIG. 10, the terminal attachment surface 48a is directed substantially horizontally, and the terminals 49–55 are held in a substantially vertical second position $P_{12}$ (more precisely, in a position tilted about 15° rearwardly downwardly) in which they project downwardly below the lower surface 2ba of the keyboard casing 2.

Therefore, the operator can turn the rotary connector 48 through the angle θ of about 75° in the directions indicated by the arrows "a", "b" to switch the terminals 49–55 easily between the substantially horizontal first position $P_{11}$ shown in FIG. 9 and the substantially vertical downward second position $P_{12}$ shown in FIG. 10, and the positioning mechanisms 61 can position the terminals 49–55 stably in the first position $P_{11}$ and the second position $P_{12}$.

Since the terminal board 69 of the rotary connector 48 and the main circuit board 71 in the keyboard casing 2 are electrically connected to the elongate flexible connector 72, the connector 72 is not subject to undue stresses when the rotary connector 58 is turned in either of the directions indicated by the arrows "a", "b", and the connector 72 is not required to be disconnected each time the rotary connector 48 is turned. This also allows the rotary connector 48 to be turned easily in the directions indicated by the arrows "a", "b".

When the keyboard casing 2 is placed on the control desk 43 by the feet 44 as shown in FIG. 4, the rotary connector 48 is turned in the direction indicated by the arrow "a" and positioned, and the terminals 49–55 are positioned in the substantially horizontal first position $P_{11}$ shown in FIG. 9 above the lower surface 2ba. Therefore, a plurality of cables 76 including an AC power supply cable can be connected substantially horizontally to the terminals 49–55 easily and safely without undue stresses from behind the keyboard 1.

When the keyboard casing 2 is placed in the recess 45 in the control desk 43 as shown in FIGS. 5 and 6, the rotary connector 48 is turned in the direction indicated by the arrow "b" and positioned, and the terminals 49–55 are positioned in the substantially horizontal second position $P_{12}$ shown in FIG. 10 below the lower surface 2ba. Therefore, the cables 76 including the AC power supply cable can be connected substantially vertically to the terminals 49–55 easily and safely without undue stresses from below the keyboard 1.

By thus changing the orientation of the terminals 49–55 between the first position $P_{11}$ and the second position $P_{12}$ depending on the mode of use of the keyboard 1 shown in FIG. 4 or the mode of use of the keyboard 1 shown in FIGS. 5 and 6, the cables 76 including the AC power supply cable can be connected to the terminals 49–55 in two alternative optimum ways.

The video camera control system which incorporates the keyboard 1 will be described below with reference to FIG. 14.

As shown in FIG. 14, the video camera control system has a plurality of monitor video cameras including outdoor video cameras 78, an indoor video camera 79, and a ceiling video camera 80. The outdoor video cameras 78 are connected to respective receivers 81. The monitor video camera control system also has a plurality of monitor television sets 83 for displaying image signals from the monitor video cameras 78–80, and a plurality of keyboards 1 each identical to the keyboard 1 described above. The video cameras 78–80, the receivers 81, the monitor television sets 83, and the keyboards 1 are connected in a matrix by a controller 84 which controls the video cameras 78–80.

In operation, the operator at each of the keyboards 1 selects a video camera number and a monitor television number with the numeric keys 15 on the keyboard to call the corresponding video camera and the corresponding television set, and operates the joyball 5 and the operation keys 6–10 with a single hand, as described above, for remotely controlling the video camera for panning and tilting movement and adjusting the optical system thereof for zooming, focusing, and iris control.

The keyboard and the video camera control system according to the present invention offer the following advantages:

The operator can tilt the joyball with a single hand, e.g., the right hand, placed on the joyball, and at the same time can operate the operation keys positioned in a substantially semicircular pattern around the joyball with the fingertips of the hand. Therefore, the operator can operate the joyball and the operation keys with only one hand, e.g., the right hand. The keyboard can thus be operated easily and efficiently.

The radius from the center of the joyball to the semicircular line along which the operation keys are arrayed is set to a value ranging from about 80 to 100 mm. Therefore, the operator can touch those operation keys easily with the fingertips without undue stresses while keeping the hand on the joyball, and hence can operate the keyboard with one hand.

Since the upper panel of the keyboard has the recess defined therein around the joyball, the operator's hand is not liable to interfere with the upper panel when cupping the hand on the joyball. Accordingly, the operator can tilt the joyball easily and smoothly.

The height from the lowermost surface of the recess in the upper panel to the flat surface on the upper end of the joyball is set to a value ranging from about 27.0 to 29.0 mm. Therefore, the operator can easily cup the hand on the joyball within the recess, and hence can easily tilt the joyball with the hand.

The joyball has the flat surface on its upper end which lies perpendicularly to the vertical axis of the joyball. When the operator cups the hand on the joyball and tilts the joyball, the hand does not slip against the joyball due to the flat surface, and the operator can tilt the joyball even with a single finger placed on the flat surface.

Inasmuch as the joyball is detachably mounted on the joystick that is tiltable in biaxial directions and the stoppers on the lower surface of the joyball are loosely fitted in the stopper limit holes in the upper panel, the angle in which the joyball can be tilted is limited within a safe range for preventing the joystick from being unduly damaged. The detachable joyball can easily be replaced.

The video cameras in the video camera control system can be controlled in their attitude by the joyball of the keyboard, and the optical systems of the video cameras can be adjusted by the operation keys of the keyboard, all with one hand of the operator. Consequently, the video cameras can be controlled in their attitudes and their optical systems can be adjusted with utmost ease by remote control through the keyboard.

Although a certain preferred embodiment of the present invention has been shown and described in detail, it should be understood that various changes and modifications may be made therein without departing from the scope of the appended claims.

What is claimed is:

1. A keyboard comprising:
   a joyball operable by an operator with a hand;
   a plurality of operation keys operable by a plurality of fingertips of the operator;
   said joyball being disposed in a central position relative to said operation keys and said operation keys being disposed in a substantially semicircular array around said joyball; and
   a joystick mounted on a upper panel of said keyboard and tiltable in a plurality of biaxial directions, said joystick being detachably inserted into said joyball;
   said upper panel having a stopper limit hole defined therein, said joyball having a stopper mounted on a lower surface thereof and loosely fitted in said stopper limit hole.

2. A keyboard according to claim 1, wherein a radius from a center of said joyball to a central line of said substantially semicircular array is set to a value ranging from 80 mm to 100 mm.

3. A keyboard according to claim 1, further comprising an upper panel having a recess defined therein around said joyball.

4. A keyboard according to claim 3, wherein a height from a lowermost surface of said recess to an upper end of said joyball is set to a value ranging from 27 mm to 29 mm.

5. A keyboard according to claim 1, wherein said joyball has a flat surface on an upper end thereof which lies perpendicular to a vertical axis of the joyball.

6. A video camera control system comprising:
   a keyboard comprising a joyball operable by a hand of an operator and a plurality of operation keys operable by a plurality of fingertips of the operator, said joyball being disposed in a central position and said operation keys being disposed in a central position on said keyboard and said operation keys being in a substantially semicircular array around said joyball;
   a joystick mounted on a upper panel of said keyboard and tiltable in a plurality of biaxial directions, said joystick being detachably inserted into said joyball;
   said upper panel having a stopper limit hole defined therein, said joyball having a stopper mounted on a lower surface thereof and loosely fitted in said stopper limit hole;
   a plurality of video cameras having respective optical systems, said video cameras being controllable in attitudes thereof by said joyball, said optical systems being adjustable by said operation keys;
   a controller for controlling said video cameras; and
   a plurality of monitor television sets for displaying image signals transmitted from said video cameras.

* * * * *